United States Patent
Li et al.

(10) Patent No.: US 10,152,577 B2
(45) Date of Patent: Dec. 11, 2018

(54) CROSS TENANT DATA ACCESS

(71) Applicant: International Business Machines Corporation, Armonk, NY (US)

(72) Inventors: Lei Li, Beijing (CN); Ning Wang, Beijing (CN); Qi Rong Wang, Beijing (CN); Xiao Feng Wang, Beijing (CN); Lei Zhi, Beijing (CN); Ying Hua Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 464 days.

(21) Appl. No.: 14/630,119

(22) Filed: Feb. 24, 2015

(65) Prior Publication Data
US 2015/0242520 A1 Aug. 27, 2015

(30) Foreign Application Priority Data
Feb. 26, 2014 (CN) .......................... 2014 1 0067372

(51) Int. Cl.
*G06F 21/10* (2013.01)
*G06F 21/62* (2013.01)

(52) U.S. Cl.
CPC .......... *G06F 21/10* (2013.01); *G06F 21/6218* (2013.01)

(58) Field of Classification Search
CPC .............................. G06F 21/10; G06F 21/6218
See application file for complete search history.

(56) References Cited

U.S. PATENT DOCUMENTS

| 8,978,122 B1* | 3/2015 | Zolfonoon .......... H04L 63/0815 726/4 |
| 9,081,982 B2* | 7/2015 | Bradley, II .......... G06F 21/6218 |
| 2011/0055151 A1* | 3/2011 | Duan ................ G06F 17/30492 707/610 |
| 2011/0082854 A1 | 4/2011 | Eidson et al. |

(Continued)

FOREIGN PATENT DOCUMENTS

| CN | 101639835 A | 2/2010 |
| CN | 102932405 A | 2/2013 |
| CN | 103399942 A | 11/2013 |

OTHER PUBLICATIONS

Marcos A. P. Leandro, et al., Multi-Tenancy Authorization System with Federated Identity for Cloud-Based Environments Using Shibboleth, in Proceedings of the Eleventh International Conference on Networks, 2012, pp. 88-93, IARIA, Published online at: http://www.thinkmind.org/index.php?view=article&articleid=icn_2012_5_10_10065.

(Continued)

*Primary Examiner* — Jorge A Casanova
(74) *Attorney, Agent, or Firm* — Lee Law, PLLC; Christopher B. Lee

(57) ABSTRACT

Cross tenant data access is provided by creating a logic view in a meta database with respect to at least a first tenant of a group of tenants and according to metadata about the respective tenants. The logic view is based upon first data owned by the first tenant as well as second data that is owned and authorized by at least another tenant of the group of tenants for the first tenant to access. The logic view in the meta database is accessed in response to a cross tenant data access request from an application of the first tenant.

16 Claims, 7 Drawing Sheets

(56) References Cited

U.S. PATENT DOCUMENTS

| | | | |
|---|---|---|---|
| 2011/0106789 A1* | 5/2011 | Gao | G06F 17/30545 707/713 |
| 2011/0145593 A1 | 6/2011 | Auradkar et al. | |
| 2012/0166976 A1 | 6/2012 | Rauh et al. | |
| 2012/0173589 A1 | 7/2012 | Kwon et al. | |
| 2012/0266239 A1* | 10/2012 | Bradley, II | G06F 21/6218 726/21 |
| 2013/0019106 A1 | 1/2013 | Fischer | |
| 2014/0040294 A1* | 2/2014 | An | G06F 17/30386 707/756 |
| 2015/0207758 A1* | 7/2015 | Mordani | H04L 47/78 709/226 |

OTHER PUBLICATIONS

Qihong Shao, Towards Effective and Intelligent Multi-tenancy SaaS, PhD Dissertation, May 2011, pp. i-285, Arizona State University, Published online at: http://repository.asu.edu/attachments/56326/content/Shao_asu_0010E_10280.pdf.

Author Unknown, Examiner, The State Intellectual Property Office of People's Republic of China, Examination Report for Chinese Application No. 20140067372.6, dated Feb. 28, 2018, pp. 1-8 (Translated), P. R. China.

Li Jinchai, Research on Multi-Tenant Access Control for SaaS Applications, Thesis, Nov. 15, 2013, pp. 1-9 (English translation not available), Information Technology of China, P.R. China.

* cited by examiner

800

CROSS TENANT DATA ACCESS

BACKGROUND

The present invention generally relates to a field of database, and more specifically, to a system and a method for cross tenant data access in a database.

Today, SaaS is becoming more and more popular. SaaS is an abbreviation for Software-as-a-Service. It is a mode in which software is provided via the Internet. By using the mode, a user does not have to purchase software, but rents Web-based software from a service provider to manage business activities of an enterprise without having to maintain the software. A user who rents software is called a tenant. Software is managed and maintained by the service provider, and while the service provider provides an Internet application to its tenants, it also provides offline operations on software and local data storage. In this way, the tenant may use software and service that the tenants anytime anywhere. For many small enterprises, SaaS is a good way to utilize the advanced technology that eliminates the need for the enterprise to purchase, build, and maintain infrastructure and application programs.

BRIEF SUMMARY

In order to solve the above problems, one of the objects of the present invention is to provide a system and a method for cross tenant data access that can transparently support the use of existing SaaS applications in a cross tenant environment.

According to one aspect of the present invention, there is provided a computer-implemented method for cross tenant data access comprising: creating a logic view in a meta database, with respect to at least a first tenant of a plurality of tenants, based upon first data owned by the first tenant as well as second data that is owned and authorized by at least another tenant of the plurality of tenants for the first tenant to access, according to metadata about the respective tenants; and accessing the logic view in the meta database in response to a cross tenant data access request from an application of the first tenant.

According to another aspect of the present invention, there is provided a system for cross tenant data access comprising: a meta database; and at least one processor programmed to execute: a managing module to create a logic view in the meta database, with respect to at least a first tenant of a plurality of tenants, based upon first data owned by the first tenant as well as second data that is owned and authorized by at least another tenant of the plurality of tenants for the first tenant to access, according to metadata about the respective tenants; and a database driving module to access the logic view in the meta database in response to a cross tenant data access request from an application of the first tenant.

With the system and method for cross tenant data access in a database according to the present invention, for all SaaS applications that need to be transformed to multi-tenant applications, it can transparently support the use of existing SaaS applications in a cross tenant environment, and this use is based on the authorization from the tenants that own the data. In addition, with the system and method for cross tenant data access in a database according to the present invention, it is easy to develop new SaaS applications in a cross tenant environment.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
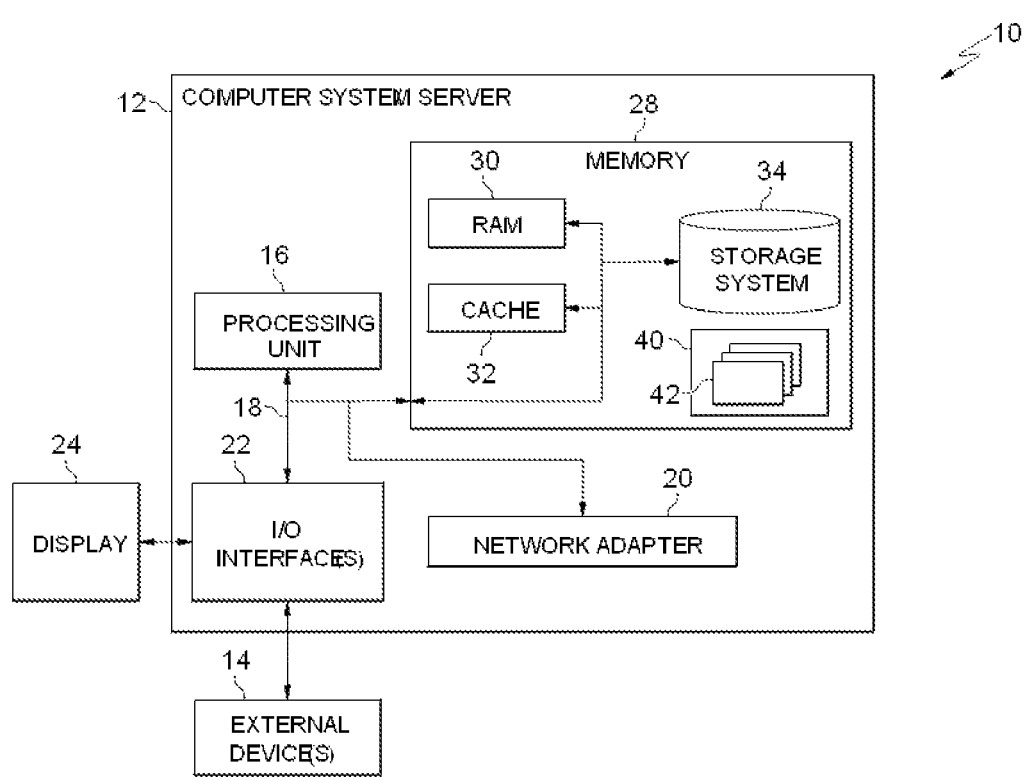
FIG. 1 illustrates a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
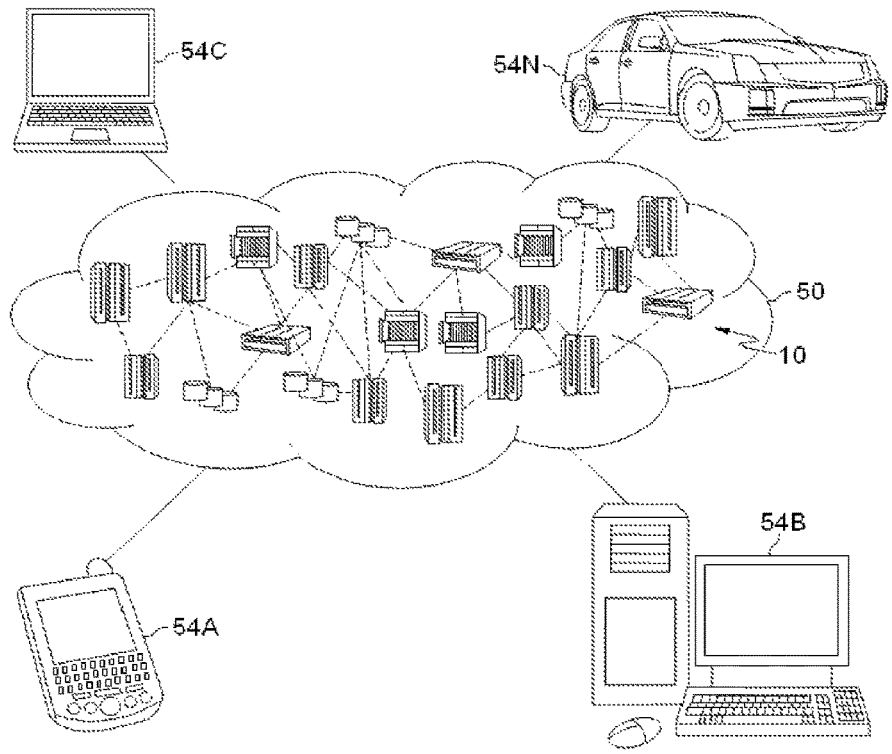
FIG. 2 illustrates a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
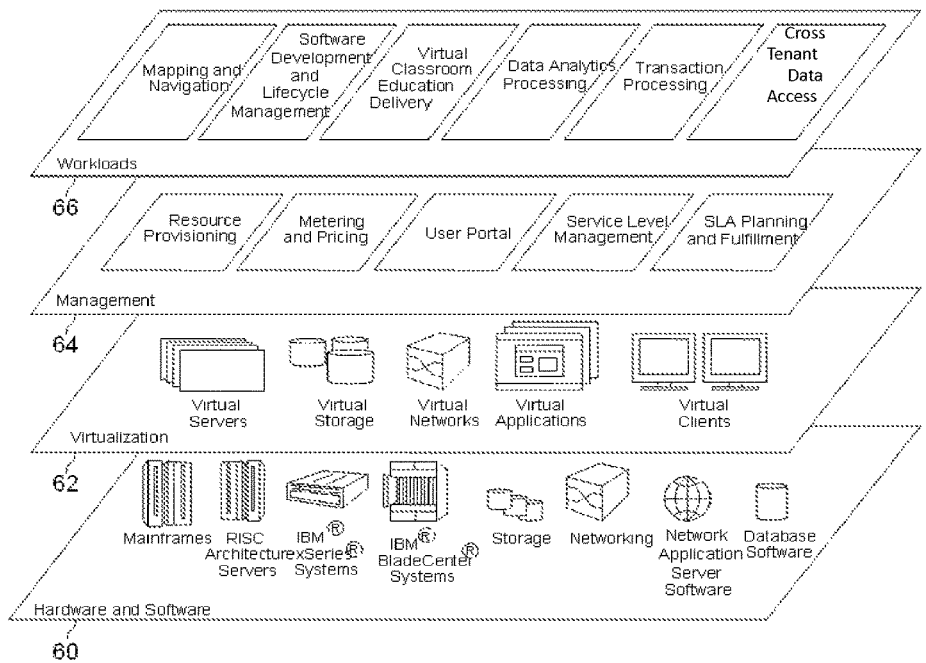
FIG. 3 illustrates abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cross tenant data access.

Hereinafter, the SaaS system is explained as an example, but the present invention is not limited thereto. Those skilled in the art should understand that in a case where a cross database query is made in any application utilizing a plurality of databases or other cloud applications, the present invention is also applicable. In addition, the term "target database" refers to a database that actually store tenants' data. The term "meta database" refers to a database different from the target database.

Figure 4:
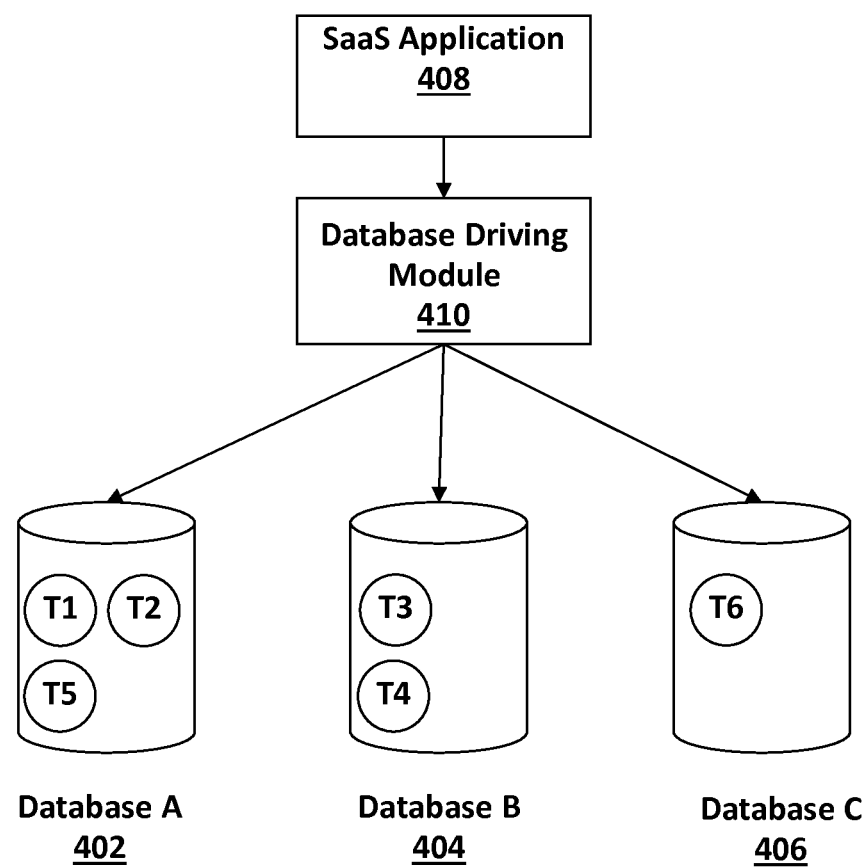
FIG. 4 illustrates an exemplary SaaS database system utilizing a scaling out mechanism.

It should be noted that conception of the present subject matter resulted from recognition of certain limitations associated with SaaS systems. For example, it was observed that a large SaaS application will have a large number of tenants and a great amount of data. With an increase in the business, it is necessary to distribute data that would originally have been stored centrally to different target databases. FIG. 4 shows an exemplary SaaS system 400. In the SaaS system 400, three target databases (A 402, B 404, and C 406) are used, and data are distributed to the three target databases by tenants. In the SaaS system shown in FIG. 4, data of tenants T1, T2, T5 are located in a database A 402, data of tenants T3, T4 are located in a database B 404, and data of tenant T6 is located in a database C 406. A SaaS application 408 may be utilized by the respective tenants to access their respective data via a database driving module 410.

Figure 5:
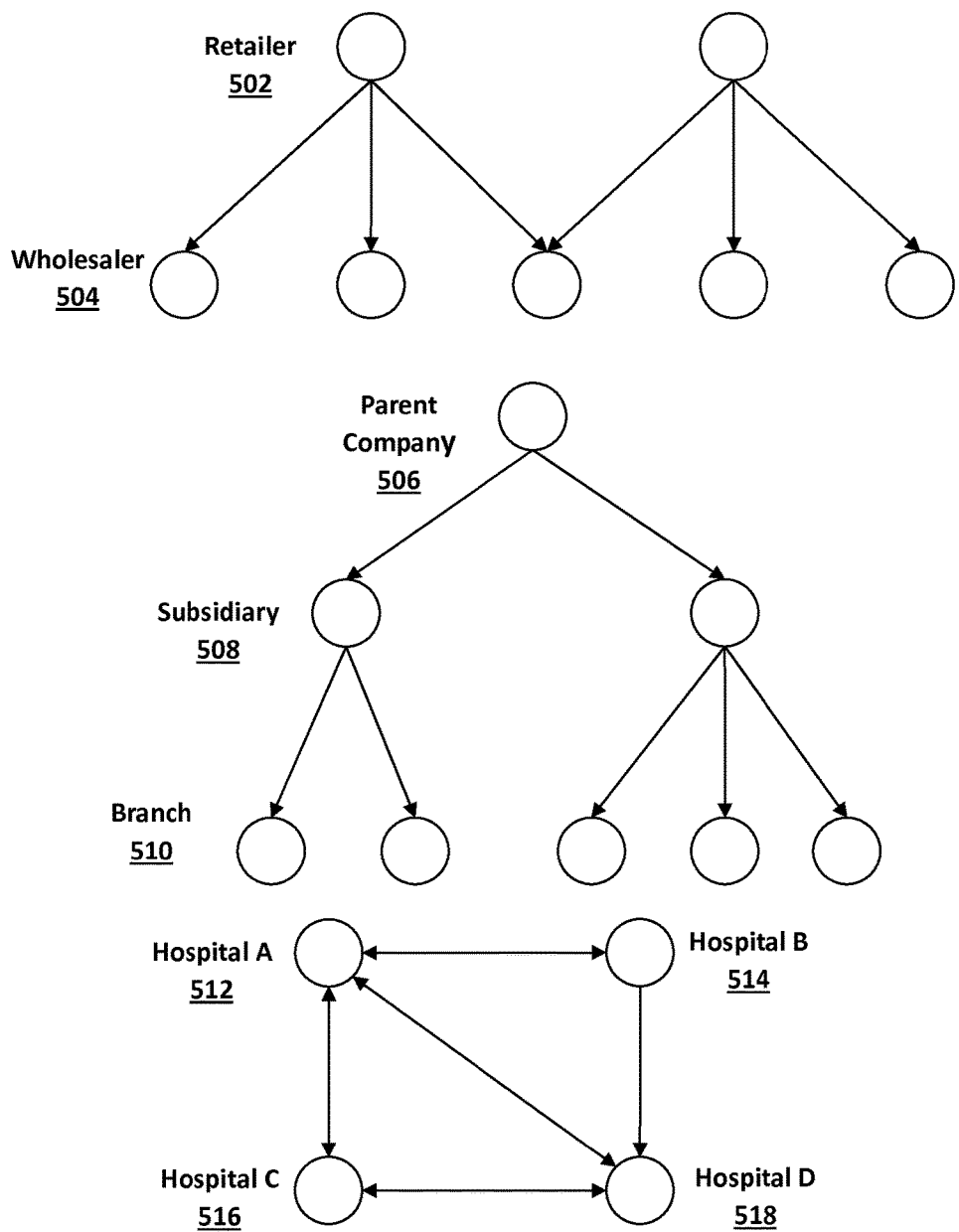
FIG. 5 illustrates several exemplary cases where cross tenant access is necessary.

It was further observed that in a conventional SaaS application, data of different tenants are isolated. However, it was determined that, in some cases, there is a need for cross tenant data access that is not provided by a conventional SaaS application. FIG. 5 shows several exemplary cases where cross tenant data access is necessary. For example, in a case where both of a retailer 502 and a wholesaler 504 are tenants of the same SaaS application, when the retailer is authorized by the wholesaler, the retailer may desire to see all or a part of data of its wholesaler. As an additional example, a parent company 506 may desire to see data of its subsidiaries 508, and a subsidiary 508 may desire to see data of its branches 510. As a further example, to implement the sharing of a patient's medical records, a hospital may desire to see his/her medical records in other hospitals. In an example in the lower part of FIG. 5, while medical records in hospital A 512 may be accessed by all of hospitals B 514, C 516, to D 518, only hospital A 512 may access medical records in hospital B 514, hospitals A 512 and D 518 may access medical records in hospital C 516, and all of hospitals A 512 to C 516 may access medical records in hospital D 518.

To satisfy the above mentioned requirements, generally, it was observed that it is necessary to modify the application manually to add relevant logic for cross tenant data access. In consideration of authorization, it was observed that it may be also necessary to add an authorization table to each of the target databases.

For example, for the case in FIG. 4, when tenant T1 (e.g., a retailer) desires to query all of its sales order data, a SQL statement "SELECT*FROM SalesOrder" may be input. Using conventional technology, it is necessary to modify the SaaS application that originally does not support a cross tenant environment to interpret that SQL statement as, for example, a SQL query statement "SELECT*FROM SalesOrder WHERE Tenant='T1'" or other forms, so that it may be used in the cross tenant environment. The SaaS system executes the SQL statement and returns all data in table SalesOrder of tenant T1 in the database A 402. However, when tenant T3 authorizes tenant T1 to access its data, in order to also return all sales order data of tenant T3 located in another database B 404, using conventional technology it is necessary to modify the SaaS application manually so that the SQL statement "SELECT*FROM SalesOrder" input by tenant T1 is interpreted as for example a SQL statement "SELECT*FROM SalesOrder WHERE Tenant='T1' OR Tenant='T3'". When another tenant T2 newly authorizes tenant T1 to access its data, again using conventional technology it is necessary to modify logic of the SaaS application again, for example, to change the "WHERE" clause. Therefore, it was determined that such cross tenant data access in conventional technology is not transparent to applications, and different modifications have to be made according to different cases, which is time-consuming and error-prone. The present subject matter improves SaaS systems and technology by providing cross tenant data access.

Figure 6:
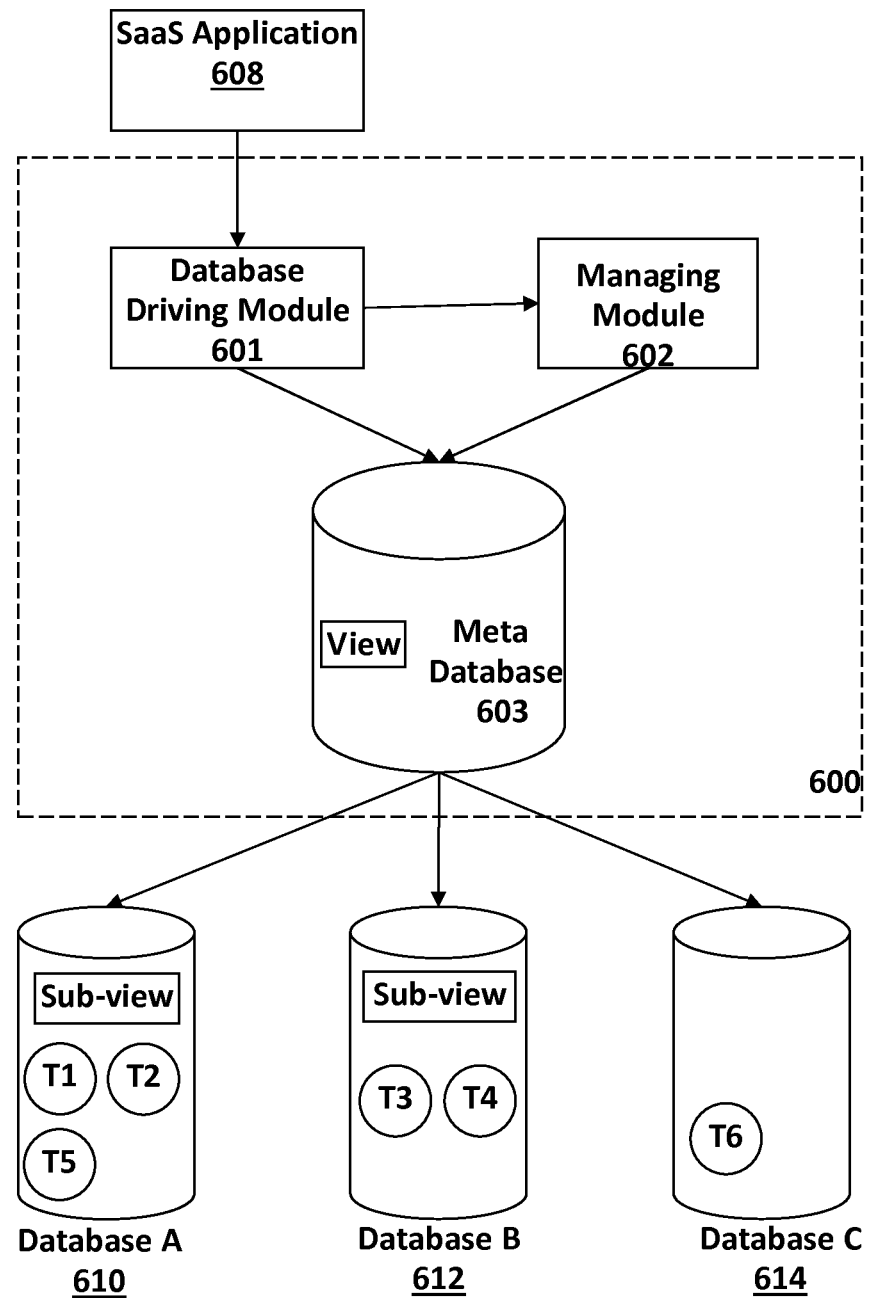
FIG. 6 is a schematic diagram illustrating a SaaS system according to an embodiment of the present invention.

FIG. 6 is a schematic diagram illustrating a new SaaS system according to an embodiment of the present subject matter. In FIG. 6, a system 600 provides cross tenant data access in a database according to an embodiment of the present subject matter and is located between a SaaS application 608 and target databases A 610, B 612, and C 614, and replaces the database driving module 410 of FIG. 4. Here, for convenience of explanation, it is assumed that tenants' data stored in target databases A 610 to C 614 in FIG. 6 are the same as that shown in FIG. 4. Although three target databases are shown, this is only an example. In other embodiments, the number of target databases is not limited to three. Two or all of databases A 610, B 612, and C 614 may be located in a same hardware device; or the databases A 610, B 612, and C 614 may also be located in different hardware devices connected through the Local Area Network (LAN) or the Internet, respectively. In the present invention, for convenience of explanation, it is assumed that databases A 610, B 612, and C 614 are located in different hardware devices respectively.

In an embodiment, each of the target databases contains data of one or more tenants, as shown in FIG. 6. In another embodiment, data of one tenant may be distributed in one or more target databases. For example, when one target database cannot accommodate data of tenant X, the data of tenant X may also be stored in another target database.

Here, for convenience of explanation, it is assumed that tenants T1 to T6 are tenants that rent a same SaaS application 608 and that their data contain tables with the same structure. Of course, tenants T1 to T6 may also be tenants that rent different SaaS applications of a same SaaS service provider. For example, tenants T1 to T5 may rent an application X, while tenant T6 rents an application Y. The present invention may also be applicable to this case.

The system 600 in FIG. 6 includes a database driving module 601, a managing module 602, and a meta database 603.

The managing module 602 is configured to create a logic view in the meta database 603, with respect to at least a first tenant of a plurality of tenants, based on a first data owned by the first tenant as well as a second data that is owned and authorized by at least another tenant of the plurality of tenants for the first tenant to access, according to metadata about the tenants. In one embodiment, the meta database 603 is different from target databases that store the first data and the second data.

The database driving module 601 is different from the database driving module 410 in FIG. 4, and is configured to access the logic views in the meta database 603, instead of target databases 610-614, in response to a cross tenant data access request from the application of the first tenant.

When a new tenant of the SaaS application 608 joins (e.g., when a user is registered as a tenant of the SaaS application 608), for example, in the offline state, a logic view is created for the tenant in the meta database 603. In one embodiment, when a new tenant is registered, the managing module 602 may provide the new tenant with a user interface that is independent of the user interface of the SaaS application 608 and that is used for collecting the tenant's metadata from the new tenant and later updating of the metadata. Since the collecting and updating of metadata are independent of the SaaS application 608, they are transparent to the original SaaS application 608, and logic of the original SaaS application 608 does not have to be modified.

In one embodiment, metadata about tenants include at least authorization relationships among a plurality of tenants. In one embodiment, the metadata may also include an operation type of authorized operations on the second data in the logic view, and the operation type is one of read or write. The operation type "read" means that data may only be read (i.e., queried), and the operation type "write" means that data may be added, modified, or deleted in addition to being read. As for the example in FIG. 6, it is assumed that metadata in the following form of an authorization table is stored in the meta database 603. These metadata are obtained by the tenant's inputting on the user interface provided by the managing module 602, for example.

| Authorization Table authorization_t | | | |
|---|---|---|---|
| ID | GRANTOR | GRANTEE | OPERATIONTYPE |
| 1 | T3 | T1 | read |
| 2 | T6 | T1 | read |
| 3 | T2 | T1 | write |

The authorization table is an example of authorization relationships among a plurality of tenants. In the authorization table, the identifier (ID) field is an identifier for distinguishing a record, the GRANTOR field indicates the authorizing party, the GRANTEE field indicates the authorized party, and the OPERATIONTYPE field indicates an operation type of authorized operations on the data of the authorizing party. For example, the first row in the authorization table indicates that tenant T3 authorizes tenant T1 to access its data, and only a read operation is permitted on the data of tenant T3. In one embodiment, the OPERATIONTYPE field is optional. For example, the read operation may be permitted in all records or the write operation may be permitted in all records by default, thereby eliminating the OPERATIONTYPE field.

The above mentioned authorization table is only one example of the authorization relationships given for convenience of explanation. Of course, the authorization table may contain other fields. In the above authorization table, for example, tenant T3 authorizes tenant T1 to access all its data. However, in reality, a tenant may want only a part of its data to be accessed by other tenants. In one embodiment, other fields may be added to the authorization table to adjust the granularity of authorized data. For example, in the example of the retailer and the wholesaler, a Product field may be added so as to limit authorization of access to only the sales order of a particular product. In the example of a hospital, a ClinicCase field may be added so as to authorize the access to a unit of medical record. Based on the teaching of the present invention, those skilled in the art may think of other methods of adjusting the authorization data granularity.

In one embodiment, the metadata may also contain other tables. In a case where a medical record is taken as the authorization unit, the metadata may also contain a medical record table for example, in which each record contains respective attributes of one medical record. In addition, the metadata may also contain a tenant table that indicates respective attributes of tenants. The metadata may also contain a logic view table that indicates a logic view corresponding to each of the tenants.

Figure 7:
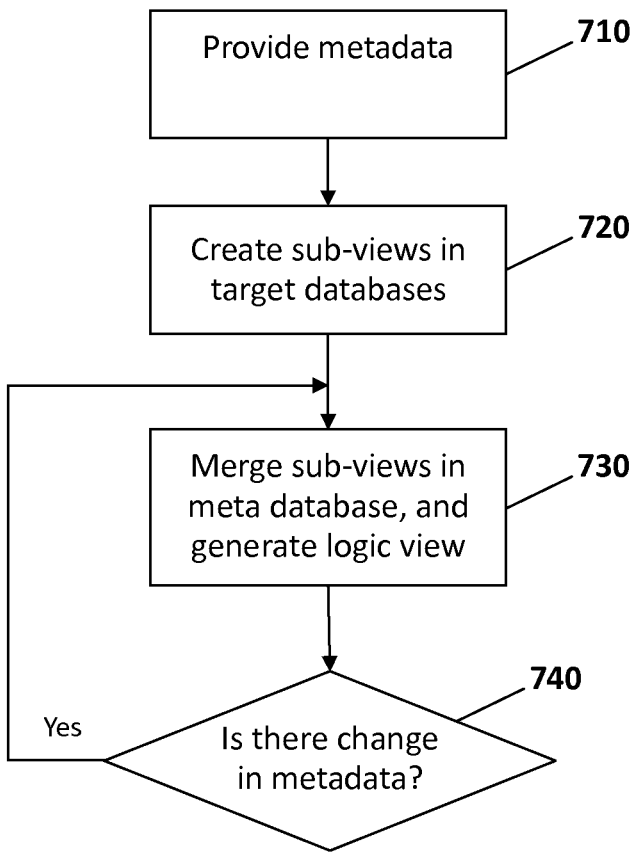
FIG. 7 is a flowchart illustrating a process of creating a logic view for a tenant in a meta database.

Hereinafter, how to create a logic view according to the present invention will be explained, specifically through the following example with reference to the flowchart in FIG. 7. FIG. 7 is a flowchart illustrating a process 700 of creating a logic view for a tenant in a meta database, such as the meta database 603.

For example, for the case in FIG. 6, it is assumed that tenant T1 is a retailer, tenants T2 to T6 are wholesalers, and tenant T1 needs to access data of some of its wholesalers. In addition, it is assumed that, in the databases A 610 to C 614, there are sales order tables SalesOrder, as shown below, respectively. In the respective SalesOrder tables shown as examples, respective fields have the meanings as follows: an ID field is an identifier for distinguishing a row, a Tenant field indicates the tenant to which data in the row belongs, a Product field indicates the name of the commodity involved in the order, a Number field indicates the number of the commodity involved in the order, and a Price field indicates the price of the commodity involved in the order.

| dbA.SalesOrder | | | | |
|---|---|---|---|---|
| ID | Tenant | Product | Number | Price |
| 001 | T1 | Television | 10 | 1000 |
| 002 | T2 | Table | 100 | 100 |
| 003 | T5 | Television | 50 | 900 |

| dbB.SalesOrder | | | | |
|---|---|---|---|---|
| ID | Tenant | Product | Number | Price |
| 0001 | T3 | Television | 10 | 1000 |
| 0002 | T4 | Biscuit | 600 | 10 |
| 0003 | T4 | Car | 5 | 15000 |

| dbC.SalesOrder | | | | |
|---|---|---|---|---|
| ID | Tenant | Product | Number | Price |
| 101 | T6 | Television | 5 | 800 |
| 102 | T6 | Mobile | 60 | 500 |

In these tables, dbA, dbB, and dbC are names of databases A 610, B 612, and C 614, respectively. In reality, even in a same database, data of different tenants may not be in a same table. In this example, sales order tables dbA.SalesOrder and dbB.SalesOrder are shared tables of a plurality of tenants, including a field Tenant for distinguishing the owner of data.

In FIG. 7, the process 700 of creating a logic view begins at step 710. In the step 710, as described above, when a new tenant registers with a SaaS application, metadata about the user is provided. The metadata includes at least authorization relationships among a plurality of tenants. For example, in the above example, when tenant T1 registers with the SaaS application 608, for example, at least the authorization table as described above is provided. The authorization table is stored in the meta database 603. In the authorization table, tenants T2, T3 and T6 authorize T1 to access their data. The formation of the authorization table also utilizes authorization provided by the tenants that are the authorizing parties, through the user interface provided by the managing module 602. For convenience of explanation, it is assumed that the authorizing party tenants T2, T3 and T6's authorization is accomplished at the same time when the tenant T1 is registered.

In addition, the managing module 602 transfers the ID of the current tenant to the respective target databases. For example, the ID of the current tenant may be transferred through a method called TenantContext.setTenantId( ) or other parameter transferring mechanisms.

In the step 720, sub-views are created in target databases. Here, the term "sub-view" is defined relative to the logic view in the meta database 603, because the logic view in the meta database 603 is the result of merging sub-views created through filtering the tables of tenants according to predetermined conditions in the respective target databases. The managing module 602 performs the filtering, by setting links to the meta database 603 in the respective target databases and based upon metadata about tenants.

Specifically, taking the DB2® database of IBM® as an example, with respect to the above example, the operation of the step 720 is explained through the following code segment.

```
/*connect to database A*/
CONNECT TO dbA;
    /*create a link to the meta database in database A, wherein dbMeta is
the name of the meta database*/
    CREATE WRAPPER DRDA LIBRARY 'libdb2drda.so';
    CREATE SERVER dbMeta TYPE DB2/UDB VERSION '9.5'
    WRAPPER "DRDA"
OPTIONS( ADD DBNAME 'dbMeta');
    /*create in database A the nickname of the authorization table in the
    meta database */
    CREATE NICKNAME authorization_t FOR
    dbMeta.authorization_t;
    /*further, create in database A the nicknames of other metadata tables
in the meta database */
```

In this way, metadata such as an authorization table, etc., in the remote meta database 603 may be accessed by using the nicknames in the database A 610. Then, the following SQL statement may be executed in the database A:

```
CREATE VIEW salesorder_v AS SELECT * from SalesOrder
    WHERE
cross_tenant_func (tenant_id, SalesOrder.Tenant);
```

Here, the name of the created sub-view is salesorder_v, the first parameter tenant_id of the function cross_tenant_func( ) is the ID of the current tenant transferred to the database A 610 by the managing module 602 (here, tenant_id is T1), and the second parameter SalesOrder.Tenant of the function cross_tenant_func( ) refers to the Tenant field of the table dbA.SalesOrder.

In one embodiment, the function cross_tenant_func( ) may contain the following judging/determining logic: for each record in the table dbA.SalesOrder, judge/determine whether the tenant indicated by the Tenant field of the record is the authorizing party of the current tenant indicated by the tenant_id, according to parameters tenant_id and SalesOrder.Tenant. In this determination, the authorization table in the meta database 603 is referred to through the nickname authorization_t. The function cross_tenant_func( ) returns true or false. Here, when the function cross_tenant_func( ) returns true, it means that the predetermined conditions are satisfied; when the function cross_tenant_func( ) returns false, it means that the predetermined conditions are not satisfied. The function cross_tenant_func( ) is only an example. In other embodiments, other more complex conditions may also be used.

For example, in the above example, by referring to the authorization table authorization_t, for the first record (ID=001) in the table dbA.SalesOrder, since tenant_id=SalesOrder.Tenant, which means that the first record is tenant T1's own data (corresponding to the above mentioned first data), the function cross_tenant_func( ) returns true. For the second record (ID=002) in the table dbA.SalesOrder, since an authorization record (ID=3) in which GRANTOR equals SalesOrder.Tenant (T2) and GRANTEE equals tenant_id (T1) is found in the authorization table authorization_t, the function cross_tenant_func( ) returns true. For the third record (ID=003) in the table dbA.SalesOrder, since an authorization record in which GRANTOR equals SalesOrder.Tenant (T5) and GRANTEE equals tenant_id (T1) is not found in the authorization table authorization_t, the function cross_tenant_func( ) returns false.

Therefore, the sub-view in the database A is created as:

| dbA.salesorder_v | | | | |
|---|---|---|---|---|
| ID | Tenant | Product | Number | Price |
| 001 | T1 | Television | 10 | 1000 |
| 002 | T2 | Table | 100 | 100 |

Likewise, a process similar to the above mentioned process performed on the database A 610 is performed on the database B 612, and the sub-view in the database B 612 is created as:

| dbB.salesorder_v | | | | |
|---|---|---|---|---|
| ID | Tenant | Product | Number | Price |
| 0001 | T3 | Television | 10 | 1000 |

This is because there is a record (ID=1) in which tenant T3 authorizes tenant T1 to access its data in the authorization table.

The above logic of creating sub-views is enclosed in the function cross_tenant_func( ) the logic relates to only the nickname of the authorization table in the meta database 603 and is not affected by data in the authorization table. That is, when a new authorization relationship emerges or an existing authorization relationship is revoked, for example, data content of the authorization table in the meta database 603 also changes. However, since the function cross_tenant_func( ) in the target database refers to only the nickname of the authorization table, when the function cross_tenant_func( ) is executed, its judging logic is fully based on the authorization table after the change. Therefore, the technical solution of the present technology achieves an effect in which the data of the current tenant and data that other tenants authorize the current tenant to access may be dynamically filtered out from shared tables in target databases without changing the judging logic (i.e., the created sub-views will automatically change with the change in the authorization relationships in the authorization table). Therefore, the implementation of creating sub-views is not limited to the above embodiment, as long as it may achieve the effect of dynamic filtering.

For the database C 614, in one embodiment, a process similar to the above mentioned process performed on the database A 610 may be performed on the database C 614 to create a sub-view dbC.salesorder_v.

| dbC.salesorder_v | | | | |
|---|---|---|---|---|
| ID | Tenant | Product | Number | Price |
| 101 | T6 | Television | 5 | 800 |
| 102 | T6 | Mobile | 60 | 500 |

In another embodiment, in a target database that contains only a single tenant's data (e.g., database C 614), the managing module 602 does not perform the filtering on the tables of the tenant, thereby not creating sub-views in the target database.

In the step 730, the managing module 602 merges the sub-views in the respective target databases in the meta database 603, thereby obtaining the logic view in the meta database 603. The managing module 602 performs the merging, by setting links to the respective target databases in the meta database 603 and based upon nicknames of the sub-views in the respective target databases.

Specifically, in the following, still taking the DB2® database from IBM® as an example, with respect to the above example, the operation of the step 730 is explained through the following code segment.

```
/* connect to meta database */
CONNECT TO dbMeta;
/* create a link to database A in meta database */
CREATE WRAPPER DRDA LIBRARY 'libdb2drda.so';
CREATE SERVER dbA TYPE DB2/UDB VERSION '9.5'
    WRAPPER "DRDA"
OPTIONS( ADD DBNAME 'dbA');
/* create in meta database the nickname of sub-view in database A */
CREATE NICKNAME salesorder_a FOR dbA.salesorder_v;
```

It is possible to connect the meta database 603 to databases B 612 and C 614, respectively, and to create nicknames salesorder_b and salesorder_c for sub-views dbB.salesorder_v and dbC.salesorder_v, respectively, in a similar way.

Then, for example, the following segment may be adopted to merge the respective sub-views into the logic view of tenant T1.

```
CREATE VIEW SalesOrder AS
SELECT * FROM salesorder_a
/* select sub-view in database A */
UNION ALL
SELECT * FROM salesorder_b
/* select sub-view in database B */
UNION ALL
SELECT * FROM salesorder_c;
/* select sub-view in database C */
```

In this way, the logic view SalesOrder is created for the tenant T1 in the meta database 603.

In another embodiment, in the step 720, since in a target database that contains only a single tenant's data (e.g., database C 614) the managing module 602 does not perform the filtering on the tenant's table, but provides the table in a case where the tenant authorizes other tenants to access its data, the merging of the table and sub-views in other target databases is performed in the meta database 603.

For example, the managing module 602 may determine which target database(s) contains only data of a single tenant according to metadata, such as a tenant table not shown (e.g., containing the relationship between the data of the tenant and the target databases where the data are located), so as to, for such target databases, determine whether to merge tables in such target databases and sub-views in other target databases according to the authorization table. As for the above example, when the managing module 602 determines from the tenant table that the database C 614 contains only data of a single tenant, and when the managing module 602 finds from the authorization table that the tenant (T6) authorizes the current tenant T1 to access its data, the following code segment may be executed: CREATE NICKNAME salesorder_c FOR dbC.salesorder. Then, when the above mentioned merging is performed, it is the data table dbC.salesorder in the database C 614 that is merged, instead of a sub-view dbC.salesorder (in this embodiment, that sub-view is not created). No matter which merging method is adopted, the obtained logic view is as follows:

| logic view SalesOrder | | | | |
| --- | --- | --- | --- | --- |
| ID | Tenant | Product | Number | Price |
| 001 | T1 | Television | 10 | 1000 |
| 002 | T2 | Table | 100 | 100 |
| 0001 | T3 | Television | 10 | 1000 |
| 101 | T6 | Television | 5 | 800 |
| 102 | T6 | Mobile | 60 | 500 |

In this logic view, the second to the fifth records correspond to the above mentioned second data (e.g., that is owned and authorized by at least another tenant of the plurality of tenants for the first tenant to access).

In the step 740, in response to a change in the authorization relationship (metadata), the logic view is updated.

In conjunction with the above example, for example, when tenant T3 revokes authorization to tenant T1, the authorization table in the meta database 603 may be changed. In response to the change, the managing module 602 determines according to the tenant table and the authorization table that no tenant whose data is located in the database B 612 authorizes tenant T1 to access its data. Therefore, the managing module 602 re-merges sub-views according to the updated authorization table. For example, at this time, the following code segment is executed instead.

```
CREATE VIEW SalesOrder_T1 AS
SELECT * FROM salesorder_a
UNION ALL
SELECT * FROM salesorder_c;
```

That is, when the logic view of tenant T1 is generated, the sub-view in the database B 612 is not merged any more.

Steps 730 and 740 may be repeatedly performed to handle the change in the authorization relationship. The above is the explanation of the process of the flowchart in FIG. 7.

In the above example, since the authorization relationship between the tenant T1 and other tenants is a many-to-one relationship, creating the logic view SalesOrder_T1 for the tenant T1 is only explained as an example. However, for example, in the case of hospitals shown in FIG. 5, the authorization relationship is a many-to-many relationship, which needs to create a corresponding logic view for each tenant in the meta database 603. This is the case for most of application scenarios.

With reference back to FIG. 6, the database driving module 601 in FIG. 6 is configured to access the views in the meta database 603, instead of target databases 610-614, in response to a cross tenant data access request from the application of the first tenant.

As for the above example, a cross tenant access request from the tenant T1 is directed to the meta database 603 so as to access the logic view in the meta database 603 instead of directly accessing target databases 610-614. For example, the SaaS application executing the SQL statement "SELECT*FROM SalesOrder" in a single tenant environment originally will return only the data of tenant T1. However, after the cross tenant data access system according to the present invention is adopted, when the SaaS application transitions to a cross tenant environment, it may execute the SQL statement to return the tenant T1's own first data, as well as the second data that is owned and authorized by at least another tenant for the tenant T1 to access, in the logic view, without modifying the logic of the SaaS application, thereby transparently supporting the use of existing SaaS applications in a cross tenant environment.

In one embodiment, the database driving module 601 is further configured to: judge/detect a cross tenant data access request from the application of the first tenant; if data to which the data access request relates are all located in a same target database, directly access the target database, instead of accessing the view in the meta database 603. Specifically, the database driving module 601 determines whether data that a data access request needs to access are all located in a same target database by using metadata such as the tenant table, the authorization table, and in the meta database 603. With the method of the embodiment, it is possible to increase the efficiency of accessing the databases in this case.

Figure 8:
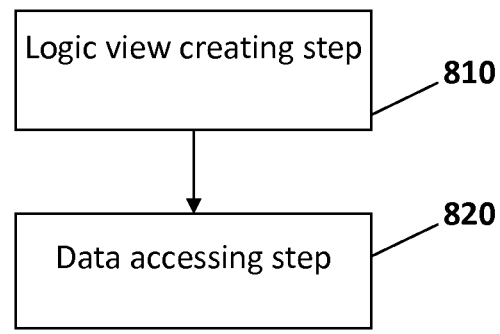
FIG. 8 is a flowchart illustrating a method for cross tenant data access in a database according to an embodiment of the present invention.

FIG. 8 is a flowchart illustrating a method 800 for cross tenant data access according to an embodiment of the present invention. The method 800 for cross tenant data access includes a logic view creating step 810 and a data access step 820. In the logic view creating step 810, the method 800 creates a logic view in a meta database, with respect to at least a first tenant of a plurality of tenants, based on a first data owned by the first tenant as well as a second data that is owned and authorized by at least another tenant of the plurality of tenants for the first tenant to access, according to metadata about the tenants. In the data access step 820, the method 800 accesses the logic view in the meta database in response to a cross tenant data access request from an application of the first tenant. For example, specific implementation of the logic view creating step 810 may adopt the process flow shown in FIG. 7. Since the process flow has already been described in detail hereinbefore, explanation is not repeated here.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for cross tenant data access, comprising:
creating a logic view in a meta database that implements dynamic filtering with respect to a first tenant of a plurality of tenants based in combination upon (i) first data owned by the first tenant and (ii) second data that is owned and authorized by a second tenant of the plurality of tenants for the first tenant to access, where the logic view in the meta database comprises a result of merging sub-views created through the dynamic filtering of tables of the respective tenants in respective target databases according to predetermined conditions, and where the sub-views are merged by setting links to the respective target databases in the meta database based upon nicknames of the sub-views in the respective target databases; and
accessing, in response to a cross tenant data access request from an application of the first tenant, the second data that is owned and authorized by the second tenant for the first tenant to access using the dynamic filtering implemented by the logic view in the meta database.

2. The computer-implemented method of claim 1, where the logic view is created according to metadata about the respective tenants and where the metadata comprises at least an authorization relationship among at least two of the plurality of tenants.

3. The computer-implemented method of claim 2, where the metadata further comprises an operation type of authorized operations on the second data in the logic view, and the operation type is one of read and write.

4. The computer-implemented method of claim 2, further comprising:
updating the logic view in response to a change in the authorization relationship.

5. The computer-implemented method of claim 1, where each of the target databases contains data of one or more of the plurality of tenants, and data of one tenant is distributed in one or more of the target databases.

6. The computer-implemented method of claim 1, further comprising:
detecting the cross tenant data access request from the application of the first tenant; and
in response to determining that the second data to which the cross tenant data access request relates is all located in a same target database, directly accessing the target database.

7. The computer-implemented method of claim 1, where the dynamic filtering is performed by setting links to the meta database in the respective target databases and based upon metadata about the respective tenants.

8. The computer-implemented method of claim 1, where the meta database is different from the target databases that store the first data and the second data.

9. A system for cross tenant data access, comprising:
a meta database; and
at least one processor programmed to execute:
a managing module to create a logic view in the meta database that implements dynamic filtering with respect to a first tenant of a plurality of tenants based in combination upon (i) first data owned by the first tenant and (ii) second data that is owned and authorized by a second tenant of the plurality of tenants for the first tenant to access, where the logic view in the meta database comprises a result of merging sub-views created through the dynamic filtering of tables of the respective tenants in respective target databases according to predetermined conditions, and where the at least one processor is further programmed to execute the managing module to merge the sub-views by setting links to the respective target databases in the meta database based upon nicknames of the sub-views in the respective target databases; and
a database driving module to access, in response to a cross tenant data access request from an application of the first tenant, the second data that is owned and authorized by the second tenant for the first tenant to access using the dynamic filtering implemented by the logic view in the meta database.

10. The system of claim 9, where the logic view is created according to metadata about the respective tenants and where the metadata comprises at least an authorization relationship between at least two of the plurality of tenants.

11. The system of claim 10, where the metadata further comprises an operation type of authorized operations on the second data in the logic view, and the operation type is one of read and write.

12. The system of claim 10, where the at least one processor is further programmed to execute the managing module to update the logic view in response to a change in the authorization relationship.

13. The system of claim 9, where each of the target databases contains data of one or more of the plurality of tenants, and data of one tenant is distributed in one or more of the target databases.

14. The system of claim 9, where the at least one processor is further programmed to execute the database driving module to:
  detect the cross tenant data access request from the application of the first tenant; and
  in response to determining that the second data to which the cross tenant data access request relates is all located in a same target database, directly access the target database.

15. The system of claim 9, where the at least one processor is further programmed to execute the managing module to perform the dynamic filtering by setting links to the meta database in the respective target databases and based upon metadata about the respective tenants.

16. The system of claim 9, where the meta database is different from the target databases that store the first data and the second data.

* * * * *